Sept. 6, 1938.  L. GOTTLIEB  2,129,128
PNEUMATIC TIRE CASING
Filed July 22, 1936
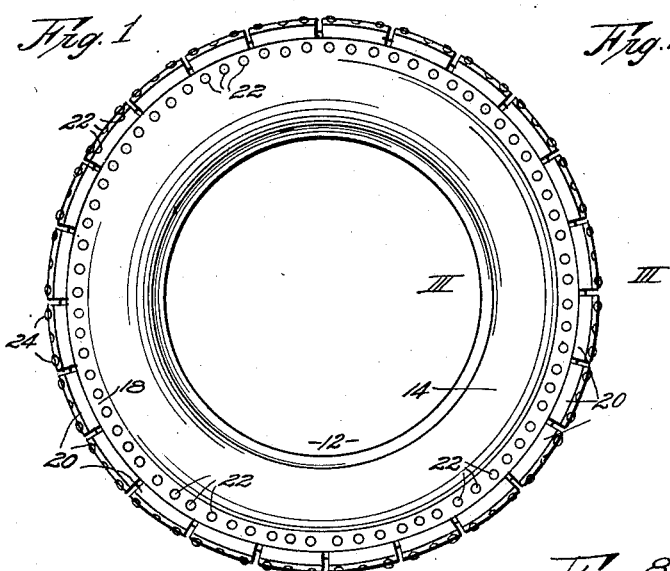
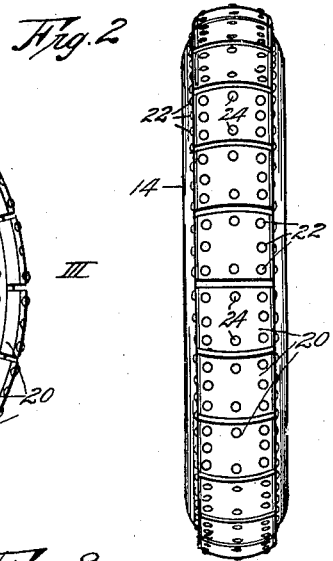
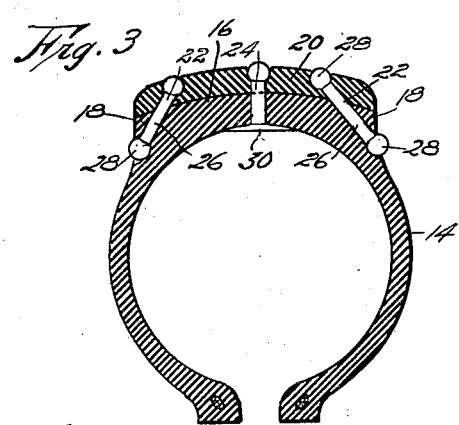
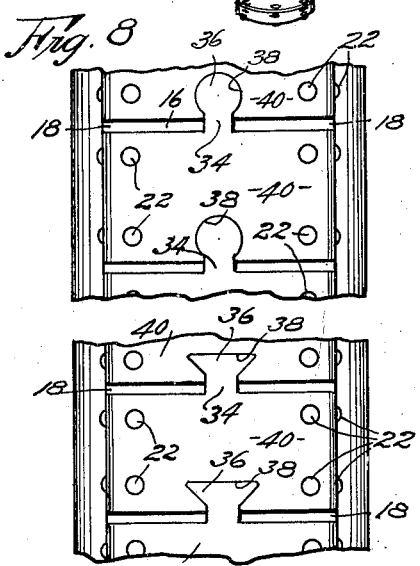
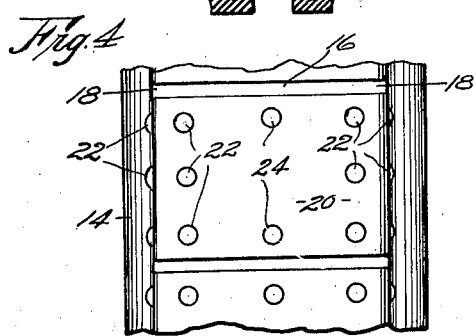
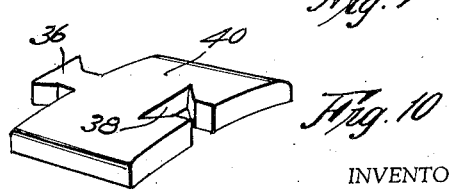
INVENTOR,
Louis Gottlieb.
BY
Hovey & Hamilton
ATTORNEYS.

Patented Sept. 6, 1938

2,129,128

UNITED STATES PATENT OFFICE 2,129,128

PNEUMATIC TIRE CASING

Louis Gottlieb, Kansas City, Mo.

Application July 22, 1936, Serial No. 91,899

8 Claims. (Cl. 152—179)

This invention relates to improvements in pneumatic tire casings.

By long service the thickened tread portion of the pneumatic tire casing becomes worn away until the fabric becomes exposed. This weakens the tire and due to its thinness at the tread, punctures are apt to be experienced. By adding a new tread to these worn tires, it has been found that the life of the tire is greatly increased; also, blowout hazards are reduced. Heretofore protective tread members have been secured to the tread portion by vulcanizing or by means of securing strips, links, etc., which interconnect with the wheel parts or with auxiliary rings which are provided as part of the equipment.

The principal object of the present invention is the provision of pneumatic tire casing having auxiliary tread members secured to the tread portion thereof by means of resilient connectors.

Another object of this invention is the provision of a pneumatic tire casing having auxiliary tread members secured directly to the tread of the casing by means of elastic connectors which function to maintain the tread members in operative relation with the tread surface of the casing, regardless of the irregular distortion of the casing, when in operation.

A further object of the invention is the provision of a casing having a series of spaced-apart auxiliary tread members independently secured to the adjacent tread portion of the casing.

Other objects are simplicity and economy of construction, ease of operation, and adaptability to casings of the various makes.

Reference will now be had to the drawing, wherein:

Fig. 1 is a side elevation of a casing for pneumatic tires embodying this invention.

Fig. 2 is an edge elevation of the casing shown in Fig. 1.

Fig. 3 is an enlarged, cross-sectional view, taken on line III—III of Fig. 1.

Fig. 4 is an enlarged, fragmentary view of the edge of the casing.

Fig. 5 is a detached view of the connector used to secure the auxiliary tread member to the tread portion.

Fig. 6 is a detached view of the connector adapted to pass through the parts as shown in Fig. 3.

Fig. 7 is a modified form of the connector, having an undulated shank.

Fig. 8 is a fragmentary view showing a modified form of the auxiliary tread members, which are adapted to interlock.

Fig. 9 is also a showing of a modified form similar to that shown in Fig. 8, and Fig. 10 is a detached, perspective view of one of the modified auxiliary tread members shown in Fig. 9.

Throughout the several views like reference characters designate like parts, and the numeral 12 indicates a casing for pneumatic tires, having an annular casing 14 of the type commonly used. The outer periphery of casing 14 is provided with a thickened tread portion 16 which contacts the roadway and gradually wears away.

Referring to Fig. 3, which shows the tread portion 16 worn away, it will be observed that the outer edges of the tread portion are relatively thicker than the remainder thereof, thus presenting an annular rib 18 at each edge of the tread portion. These ribs serve as a body suitable for anchoring the auxiliary tread members 20. Tread members 20 are preferably formed from old tire casings and consist of strips positioned transversely on the tread portion of the casing in spaced-apart relation. The inside surface of the auxiliary tread members is concave and conforms to the outer tread portion of the casing on which they are positioned, and may vary in width from relatively narrow strips to sections that extend half way around the casing.

These auxiliary tread members are independently secured directly to the adjacent tread portion of the casing by means of connectors 22 and 24. Preferably, connectors 22 and 24 are made of an elastic material such as rubber, and consist of a body portion 26 and enlarged end portions 28. Connectors 22 are adapted to be extended through edge portion of 20 and the rib 18, as shown in Fig. 3. To position the connectors as shown, the shank and one end of the connector is inserted in the body portion of a hollow sharpened needle so that as the needle is passed through the rubber parts, the exposed, enlarged end 28 will be engaged and as the needle is drawn from the parts, the connector will be positioned as shown. When so placed, the rubber of the tread members will tightly engage the body of the connector and the enlarged ends 28 will prevent the longitudinal movement thereof. When so positioned these connectors are extended, and, thereby, due to their position at opposite ends of the auxiliary tread member, will exert a tensioning of the tread member to maintain it in operative condition on the tread portion of the casing during the running operation.

This close fitting of the parts will, to a large degree, eliminate friction and heating of the tread members. In many instances these side connectors will be sufficient to hold the auxiliary tread members in position; however, other connectors 24 extended directly through the casing and tread members may be provided where greater securing strength is required.

In order to present a smooth surface at the inside of the casing, a large, flat head for the connector is required. It should be observed that the connectors function to join the tread members to the casing without passing through the casing, thus maintaining the inner surface of the casing in its natural form.

The modified form of connector shown in Fig. 7 having an undulated body portion 32 with an enlarged end 34 could be substituted for either of the connectors 22 or 24. The undulated body 32 would tend to grip the rubber of the treads to preclude longitudinal movement. More rigid connectors might be used, and in some instances screw connector members have been found to function satisfactorily.

The modified forms of auxiliary tread members shown in Figs. 8, 9 and 10 provide for interlocking means between the members 40. A tongue 34 formed on one side of the members, and having an enlarged head 36 adapted to be snugly fitted into a notch 38 formed in the adjacent member, functions to interconnect the tread members. By this means it is apparent that all the tread members may be united together in an annular form about the casing. When so united, the edge connectors may be sufficient to secure the parts together; however, connectors 24 may also be used with this form of auxiliary tread members if desired. Auxiliary tread members 20 may be made of a length sufficient to overlap the tread portion of the casing to present a greater contact surface with the roadway.

It is apparent that many variations in size and shape of the parts may be made without departing from the scope of the appended claims.

What I claim is:

1. A casing for pneumatic tires comprising an annular one-piece casing having a tread portion at its outer periphery; spaced-apart, auxiliary tread members positioned on said tread portion; and elastic connectors extending diagonally through the outer portion of said tread portion and said tread members to independently secure each of said auxiliary tread members to said tread portion.

2. A casing for pneumatic tires comprising a one-piece annular casing having a substantially smooth tread portion at its outer periphery; spaced-apart, auxiliary tread members positioned on said tread portion; and elastic rivets to join and resiliently interconnect each of said auxiliary tread members with said tread portions.

3. A casing for pneumatic tires comprising a one-piece annular casing having a tread portion at its outer periphery; a series of spaced-apart auxiliary tread members positioned on said tread portion; means connecting the outer edges of each of said auxiliary tread members with the adjacent portion respectively of said tread portion; and elastic members extending through said tread portion and auxiliary tread member whereby they are joined together adjacent their center portions.

4. A casing for pneumatic tires comprising an annular one-piece casing having a substantially smooth tread portion at its outer periphery; a series of interlocking, auxiliary tread members positioned on said tread portion; and elastic members to secure each of said auxiliary tread members to said tread portion to secure them against transverse and longitudinal relative movement.

5. A casing for pneumatic tires comprising an annular one-piece casing having a tread portion at its outer periphery; a series of interlocking, auxiliary tread members positioned on said tread portion; and elastic means extending through openings formed through said tread portion and said tread members to independently secure each of said auxiliary tread members to said tread portion and to exert a tension in said auxiliary tread members transversely to the tread portion.

6. A casing for pneumatic tires comprising an annular casing having an outer tread portion; sectional auxiliary tread members positioned on said tread portion; and elastic connectors interconnecting each of said auxiliary tread members with said tread portions; said connectors being under tension whereby a tension is set up in said tread members transversely to said tread portion.

7. A casing for pneumatic tires comprising a unitary annular casing having a tread portion at its outer periphery; spaced apart auxiliary tread members positioned on said tread portion; and a plurality of spaced apart elastic connectors to secure each of said auxiliary tread members to said tread portion, whereby the auxiliary tread members are held in tension against said tread portion.

8. A casing for pneumatic tires comprising a one-piece annular casing having a tread portion at its outer periphery; spaced apart auxiliary tread members positioned on said tread portion; and elastic members respectively interconnecting the outer edges of each of said auxiliary tread members with said tread portion and exerting a tension on said auxiliary tread members transversely of said tread portion.

LOUIS GOTTLIEB.